US012496747B2

(12) United States Patent
Bernicke et al.

(10) Patent No.: US 12,496,747 B2
(45) Date of Patent: Dec. 16, 2025

(54) WEDGE FILLER PREFORM (71) Applicant: TEIJIN CARBON EUROPE GMBH, Wuppertal (DE)

(72) Inventors: Roland Bernicke, Hilden (DE); Markus Schneider, Düsseldorf (DE); Marco Pöhler, Aachen (DE); Julian Lowe, Wuppertal (DE)

(73) Assignee: TEIJIN CARBON EUROPE GMBH, Wuppertal (DE)

( * ) Notice: Subject to any disclaimer, the term of this patent is extended or adjusted under 35 U.S.C. 154(b) by 837 days.

(21) Appl. No.: 17/603,360

(22) PCT Filed: Mar. 23, 2020

(86) PCT No.: PCT/EP2020/057965
§ 371 (c)(1),
(2) Date: Oct. 13, 2021

(87) PCT Pub. No.: WO2020/212087
PCT Pub. Date: Oct. 22, 2020

(65) Prior Publication Data
US 2022/0184852 A1    Jun. 16, 2022

(30) Foreign Application Priority Data
Apr. 18, 2019  (EP) .................................... 19170061

(51) Int. Cl.
| *B29B 11/16* | (2006.01) |
| *B29C 33/26* | (2006.01) |
| *B29C 43/34* | (2006.01) |
| *B29C 43/52* | (2006.01) |
| *B29D 99/00* | (2010.01) |
| *B29L 31/30* | (2006.01) |

(52) U.S. Cl.
CPC .............. *B29B 11/16* (2013.01); *B29C 33/26* (2013.01); *B29C 43/34* (2013.01); *B29C 43/52* (2013.01);
(Continued)

(58) Field of Classification Search
CPC ......... B29B 11/16; B29C 33/26; B29C 43/34; B29C 43/52; B29D 99/00; B29L 31/30
See application file for complete search history.

(56) References Cited

U.S. PATENT DOCUMENTS 5,294,461 A  *  3/1994  Ishida ................... B29C 70/521
                                                    156/181
5,639,535 A      6/1997  McCarville
(Continued)

FOREIGN PATENT DOCUMENTS

EP    2727693 A1    5/2014
EP    2727694 A1    5/2014
(Continued)

OTHER PUBLICATIONS

May 19, 2020 International Search Report issued in International Patent Application No. PCT/EP2020/057965.
(Continued)

*Primary Examiner* — Lynda Salvatore
(74) *Attorney, Agent, or Firm* — Oliff PLC (57) ABSTRACT A filler preform in a wedge form includes reinforcing fiber bundles consisting of reinforcing fiber filaments, wherein the filaments are directed parallel to each other within the fiber bundle, wherein the fiber bundle contains a first resin composition in a concentration in the range from 1 to 10 wt. % relative to the fiber weight, wherein the fiber bundles have a length in the range from 2 to 20 mm and at least 60% of the fiber bundles are reversibly fixed in a curved form within the wedge filler preform whereby flanks of the curved fiber bundles create an opening angle of less than 120° and the opening angle of the curved fiber bundles relates with an opening angle of the wedge form of the wedge filler pre-
(Continued)

form. A method for producing the wedge filler preform and a method for producing a reinforcing fiber composite include a filler perform.

14 Claims, 6 Drawing Sheets

(52) U.S. Cl.
CPC .. *B29D 99/0005* (2021.05); *B29C 2043/3433* (2013.01); *B29C 2043/3488* (2013.01); *B29L 2031/3076* (2013.01)

(56) References Cited

U.S. PATENT DOCUMENTS

| | | | | |
|---|---|---|---|---|
| 5,650,229 | A | * | 7/1997 | Gross ...................... B29B 11/16 428/113 |
| 9,827,710 | B2 | | 11/2017 | Rossi et al. |
| 2012/0052247 | A1 | | 3/2012 | Pook et al. |
| 2013/0209724 | A1 | | 8/2013 | Reiter et al. |
| 2015/0231848 | A1 | | 8/2015 | Chapman et al. |
| 2016/0089856 | A1 | | 3/2016 | Deobald et al. |

FOREIGN PATENT DOCUMENTS

| | | |
|---|---|---|
| EP | 2727711 A1 | 5/2014 |
| EP | 2871050 A1 | 5/2015 |
| EP | 3446864 A1 | 2/2019 |
| WO | 98/22644 A1 | 5/1998 |
| WO | 2005/095080 A1 | 10/2005 |
| WO | 2013/017434 A1 | 2/2013 |

OTHER PUBLICATIONS

May 19, 2020 Written Opinion issued in International Patent Application No. PCT/EP2020/057965.

* cited by examiner

WEDGE FILLER PREFORM

The present disclosure relates to a wedge filler preform, a fiber composite comprising a wedge filler preform, a method for producing a wedge filler preform and a method for producing a fiber composite comprising the wedge filler preform.

Radius fillers are known in the prior art. Cracking of integrally stiffened composite structures, especially in aerospace applications, often initiates in a radius filler (i.e., noodle) located at an interface between a skin and integral stiffening elements of the composite structures. Traditional radius fillers, also known as "noodles", have a great amount of resin.

A filler preform is a three-dimensional dry structure which has nearly the three-dimensional form of the end-product. Thus, it is a preformed product. The preform differs from the end-product in the amount of resin, which is only applied to the preform during the manufacturing process of the end-product. Therefore, a preform is described as a dry structure containing less resin. Less resin means a resin concentration of less than 15 wt % of the total fiber weight of the preform, In document U.S. Pat. No. 9,827,710 for example a radius filler is described. The radius filler of the patent position includes a resin, whereby the resin is added before or after a braiding step. According to FIG. 5 of the above-named document dry fibers be braided and then later wetted in a resin bath or alternatively the fibers be provided as prepreg fibers that be pre-impregnated or pre-coated with resin. However, in all embodiments of U.S. Pat. No. 9,827,710 the amount of resin in the radius filler is far higher than 10 wt % relative to the total fiber weight of the radius filler. Thus, this document does not disclose a preform filler. Due to the high amount of resin the weight of the radius filler is high and also the lifetime of the filler is at least linked to the lifetime of the resin material.

In addition, prior art radius fillers have the disadvantages that they are not or less adaptable on cavities.

It is thus the aim of the present invention to create a wedge filler preform, which overcomes the prior art disadvantages.

The aim is achieved by a wedge filler preform according to present claim 1.

In context of this application the term "wedge" means that the filler preform has a triangular shape. A "wedge" form means a triangular form comprising two flank areas, a vertex in between and two end face areas. The surface area of each end face is smaller than the surface area of each flank area. The term "wedge" encompasses also a trapeze form of the wedge filler preform.

The wedge filler preform of the present idea comprises reinforcing fiber bundles wherein the fiber bundles contain a first resin composition in a concentration in the range from 1 to 10 wt. % relative to the fiber weight. At least 60%, preferred at least 70%, of the reinforcing fiber bundles are present in the wedge filler preform in a curved form as curved reinforcing fiber bundles, whereby the curved form of the fiber bundles is reversibly fixed in the wedge filler preform via the first resin composition. The curved reinforcing fiber bundles (also called curved fiber bundles) have two flanks, whereby the flanks create an opening angle α'. This opening angle is less than 120°. Within the wedge filler preform the curved fiber bundles are arranged in such a manner that a minimal turning point of the curved form is directed to the vertex of the wedge filler preform. The opening direction of the opening angle of the curved fiber bundles is approximately the same as the opening direction of the opening angle of the wedge filler preform.

Due to the reversibly fixed curved form the curved fiber bundles become pre-loaded within the wedge filler preform.

Document US 2013/0209724 discloses a pile, which is made up of fiber bundles and binding fibers which fiber bundles being able to have a binder material. The fiber bundles have a curved shape, which enders them a preferred orientation whereby the fiber bundles are fixed within the layer by the binder fibers. However, document US 2013/0209724 does not disclose a preform. This document does also not disclose or teach a preform in which fiber bundles are present in a curved form whereby the curved form corresponds to the three-dimensional form of the preform. In addition, fiber bundles containing 1 to 10 wt. % resin composition relative to the fiber weight are also not disclosed in this document.

Document EP 3 446 864 discloses a gap filler comprising carbon fibers. The carbon fibers are randomly dispersed throughout the gap filler such that the fibers are oriented in multiple directions [0011]. A preform with fiber bundles aligned in a preferred direction is not disclosed in this document. In the manufacturing process for the gap filler according to EP 3 446 864 a resin and the carbon fibers are mixed for example via an extruder [0030]. Thus, a resin concentration in the range from 1 to 10 wt % relative to the fiber weight is also not disclosed in this document.

In U.S. Pat. No. 5,650,229 a filler preform is disclosed in which fiber bundles are aligned within a cavity and a capping device presses the fiber bundles into the cavity. This document does not disclose curved fiber bundles. As seen in FIGS. 4b, 4c, and 5b the fibers are not curved within the filler.

The reinforcing fiber bundles in the wedge filler preform have inventively a content of a first resin component in the range of 1 to 10 wt. %, preferably 3 to 5 wt. %, in relation to the fiber proportion. Within the wedge filler preform the first resin composition is homogenously distributed. By this means, a sufficient stability is provided to the reinforcing fiber bundles and a disintegration into individual filaments is avoided. At the same time, use of the resin applications according to the invention guarantees that the reinforcing fiber bundles adhere to each other during the formation of the wedge filler preform and the wedge filler preform thus achieves a sufficient stability for additional handling. In a preferred embodiment of the invention, the first resin composition is a thermally activatable binder material, for example a thermoplastic. However, preferably the binder material is based on epoxy resins, wherein the binder material can be multiply melted and can be converted to a fixed state by cooling to room temperature. Resin compositions of this type, or reinforcing fibers that have these types of resin compositions, are disclosed for example in WO 2005/095080. WO 98/22644 also discloses these types of resin compositions suitable as binders. In respect of the reinforcing fiber bundles comprising a first resin composition reference is made to European patent application EP2736691A1 which is hereby incorporated by reference. Especially, the disclosure of the resin composite on page 6 to 15 is incorporated by reference for the first resin composition according to the present disclosure.

The pre-impregnation of the reinforcing fiber bundles with the first resin composition thereby allows for a compact, stable laying of these reinforcing fiber bundles during the production of the wedge filler preform.

Preferably the reinforcing fibers of the reinforcing fiber bundles are carbon fibers. In one preferred embodiment each reinforcing fiber bundle has 500 to 24,000 reinforcing fiber filaments. To achieve the most homogeneous distribution of the reinforcing fiber bundles in the wedge filler preform the number of reinforcing fiber filaments in the reinforcing fiber bundles lies particularly preferably in the range from 500 to 6,000 and more particularly preferably in the range from 1,000 to 3,000. To achieve high fiber volume proportions in the wedge filler preform, it has likewise proven to be advantageous if the wedge filler preform has a plurality of groups of reinforcing fiber bundles having differing numbers of reinforcing fiber filaments, because this allows the realization of high packing densities of the bundles in the wedge filler preform. For example, reinforcing fiber bundles having 3,000, 6,000, and 12,000 reinforcing fiber filaments can be combined.

Preferably the fiber bundles are homogeneously distributed over the wedge filler preform. The term "homogeneously distributed" means that the amount of fiber bundles is approximately the same in every part of the wedge filler preform. "Approximately" means that a variation of less than 5% is included. Especially in the vertex part of the wedge filler preform the amount of fiber bundles may vary.

In one preferred embodiment the curved reinforcing fiber bundles are oriented isotropically in the directions parallel of the opening angle of the wedge filler preform. "Isotropically" is thereby understood as meaning that, while there is an anisotropic orientation of the fibers within the individual reinforcing fiber bundles, the bundles in their totality show no preferred orientation. The reinforcing fiber bundles are sprayed or poured into the mold, whereby the vertex of the mold is the most distant point of the filling opening of the mold.

It should be understood that at least 60% of the curved reinforcing fiber bundles have an opening angle with nearly the same direction of the opening angle of the wedge filler perform. The term "nearly the same" means the values differ less than 30°, preferably less than 20°. In addition, at least 60% of the curved reinforcing fiber bundles have an opening angle with relates to the opening angle of the wedge filler perform. This means, the value of the opening angle of the curved reinforcing fiber bundles differ from the value of the opening angle of the wedge filler preform less than 5°, preferably less than 2°.

In a further embodiment the reinforcing fiber bundles are oriented in a certain direction of the wedge filler preform. For example, at least 40%, more preferred at least 60%, and most preferred at least 70% of the total amount of reinforced fiber bundles are oriented in the wedge formed mold such that the fiber direction of the fiber bundles is nearly perpendicular to the opening angle of the wedge formed mold.

Preferably, the width of the fiber bundles (reinforcing fiber bundles) varies in the range of 0.5 to 10 mm. "Variation" means that within the named range all widths are possible, whereby no width is more present than other widths. Due to the variation of the width and the statistic distribution, the fiber bundles can fill the preform for building the wedge filler preform very well.

In a more particularly preferred embodiment of the wedge filler preform, the reinforcing fiber bundles arranged within the wedge filler preform have differing lengths and/or differing width and/or differing numbers of reinforcing fiber filaments. This leads to especially high fiber volume proportions in the wedge filler preform (and thus also in the composite comprising the filler). According to the invention, the wedge filler preform has across its entire extension, i.e. at every point of its extension, a proportion of reinforcing fibers of at least 35 vol. %, preferably a proportion of reinforcing fibers of at least 40 vol. %, and particularly preferably of 45 vol. %. It is especially advantageous if the proportion of reinforcing fibers amounts to at least 50 vol. % because this leads to a robust structure component. However, if a light weight structure component is needed, also fillers with less than 35 vol % reinforcing fiber bundles are possible. Due to the variation possibilities of width and length of the fiber bundles and numbers of filaments, the amount of fiber within the filler are adjustable.

The proportion of reinforcing fibers in the wedge filler preform can be determined following DIN EN 2564:1998. For this purpose, the wedge filler preform is impregnated according to usual methods with an epoxy resin such as HexFlow RTM 6 (Hexcel) and cured into a composite material. Test bodies are cut from the cured composite material, from which mass and density are determined according to DIN EN 2564:1998, as well as, after treatment with concentrated sulfuric acid to separate the matrix resin, the mass of the fibers contained in the test bodies. According to the provisions of DIN EN 2564:1998, the fiber mass proportion can thus be determined and, resulting therefrom, the fiber volume proportion or the proportion of reinforcing fibers. This method can also be used to determine the fiber volume proportion for the composite.

In one preferred embodiment the total amount of resin in the entire wedge filler preform is less than 10 wt % relative to the total fiber weight of the wedge filler preform. It is preferred that the resin in the wedge filler perform is present only in form of the first resin composition of the fiber bundles. No further resin is present within the entire wedge filler preform. Due to the less amount of resin the wedge filler preform is light. However, the amount of resin within the wedge filler preform is enough to keep the filler in a desired form and to retain the curved form of the fiber bundles.

The wedge filler preform has preferably a constant mass per unit area. Even if the thickness of the wedge filler preform is variably adjustable during the manufacturing process of the reinforcing composite, the mass per unit is still constant.

Preferably, a textile layer is arranged on at least on surface of the wedge filler preform or as a sheath around the wedge filler preform. The textile layer is preferably a woven or UD-layer made from carbon fibers. The textile layer is preferably coated with a matrix material, whereby the matrix material of the textile layer is not part of the total amount of matrix material of the wedge filler preform.

In one other embodiment the wedge filler preform is partially or completely separated in parts and arranged on a textile layer. Preferably, the arrangement is achieved by an adhesive connection between the wedge filler preform and the textile layer. The textile layer for this embodiment is preferably a flexible textile layer. Flexible means that the textile layer can easily be arranged in a curved form.

The flexible textile layer is preferably a woven, a nonwoven or a UD-layer or the flexible textile layer is a multi-layered composition comprising a combination of the mentioned layers. Due to the partially or completely separated wedge filler preform on a flexible textile layer the wedge filler preform is easily adaptable also to curved forms (curved gabs in further preforms).

In one embodiment the wedge filler preform has a trapeze end face. This means, the two end surfaces of the wedge form have a trapeze form. The opening angle $\alpha'$ of the curved fiber bundles are positioned in a similar direction and relates with an opening angle $\alpha$ of the filler preform. The opening angle $\alpha$ of the wedge filler preform with trapeze end faces results from the imaginary extension of the two flank areas for a wedge form (see FIG. 5).

A further object of the present invention is a fiber composite which comprises a wedge filler preform according to the above layout. The fiber composite is preferably a reinforcing fiber composite.

A further object of the present invention is a method for producing the wedge filler preform. For producing the wedge filler preform, reinforcing fiber bundles consisting of reinforcing fiber filaments, wherein the filaments are directed parallel to each other within the fiber bundle and comprising a first resin composition in the range from 1 to 10 wt. % relative to the fiber weight, are distributed into a wedge formed mold. The above-named fiber bundles are preferably sprayed into the mold—in this respect the apparatus according to EP 2727694 and EP 2727693 is used and the documents are hereby incorporated by reference. The method and apparatus of the patent positions is preferably used without a longitudinal cutting mechanism. However, it is also possible to pour the fiber bundles in the wedge formed mold. For manufacturing the wedge filler preform, a force and a thermal energy is applied to the mold. Due to the thermal energy the first resin composition melts and rendered tacky. The wedge formed mold comprises two flanks and in between a mold opening angle β. Further, the wedge formed mold comprises two end faces, whereby the surface area of each flank area is greater than the surface area of each end face area. The applied force acts only on at least one flank area. Due to this force the fiber bundles are pressed in a curved form and are reversibly held in this form via the tacky first resin composition. At least 60%, preferred at least 70% of the total amount of reinforcing fiber bundles are pressed in the curved form. "Curved form" means that the curved fiber bundles have a minimal turning point (vertex) whereby the fiber ends build up flanks. The flanks of the curved fiber bundles create an opening angle of less than 120°, preferably less than 100°, more preferably less than 90° and most preferred less than 45°. The curved fiber bundles are arranged within the wedge formed mold in such a way that the minimal turning point (vertex) is directed to the minimal turning point (vertex) of the mold. The force is applied to the mold in such a way that the flanks of the mold are pressed against each other. Afterwards the first resin composition cools down and the curved form of the reinforcing fiber bundles is reversible fixed in the wedge filler preform.

Due to the producing method the curved fiber bundles obtain an initial load like a spring tension. If the wedge filler preform is heated again the first resin composition melts again and the curved fiber bundles become flexible again. The curved fiber bundles have the tend to relax and try to go back into an elongate form. This effect is used for the method for producing a reinforcing fiber composite comprising the wedge filler preform. The opening angle β of the mold is equal to the opening angle α of the wedge filler preform. This means the value of the opening angles α and β are approximately equal and also the opening direction are approximately equal.

For the method for producing the reinforcing fiber composite the wedge filler preform is arranged within a further fiber preform within a further mold. A second (warm) resin composition is applied to the further mold and due to heat (for example of the second resin composition or due to a heated the further mold) the first resin composition is heated and the curved fiber bundles become flexible and the opening angle of the curved reinforcing fiber bundles increases. Due to this effect the thickness of the wedge filler preform will increase on parts of the wedge filler preform where the opening angle of the curved fiber bundles increases. This process is influenced by the inner form or the cavities of the reinforcing fiber composition in which the wedge filler preform is arranged. It should be understood that the thickness of the wedge filler preform increases until the wedge filler preform is in direct physical contact to the reinforcing fiber composite. Thus, undesirable or desirable cavity variation of the reinforcing fiber composite can be compensated via the wedge filler preform.

Preferably for at least 20%, more preferred for at least 30% and most preferred for at least 60% of the curved fiber bundles the opening angle increases due to the application of the second resin composition. Preferably, the opening angle of the curved fiber bundles increases for at least 5°, more preferred for at least 10° and most preferred for at least 20° compared to the opening angle before the wedge filler preform is arranged within the reinforcing fiber composition or the further mold.

In one preferred embodiment the applied wedge filler preform for producing the reinforcing fiber composite has a constant thickness gradient and the further fiber preform has at least one cavity with a thickness variation.

Possible methods for infusion or injection the further resin composition in this case are the so-called liquid molding (LM) method, or methods related thereto such as resin transfer molding (RTM), vacuum assisted resin transfer molding (VARTM), resin film infusion (RFI), liquid resin infusion (LRI), or resin infusion flexible tooling (RIFT).

The invention is described via figures.

Figure 1:
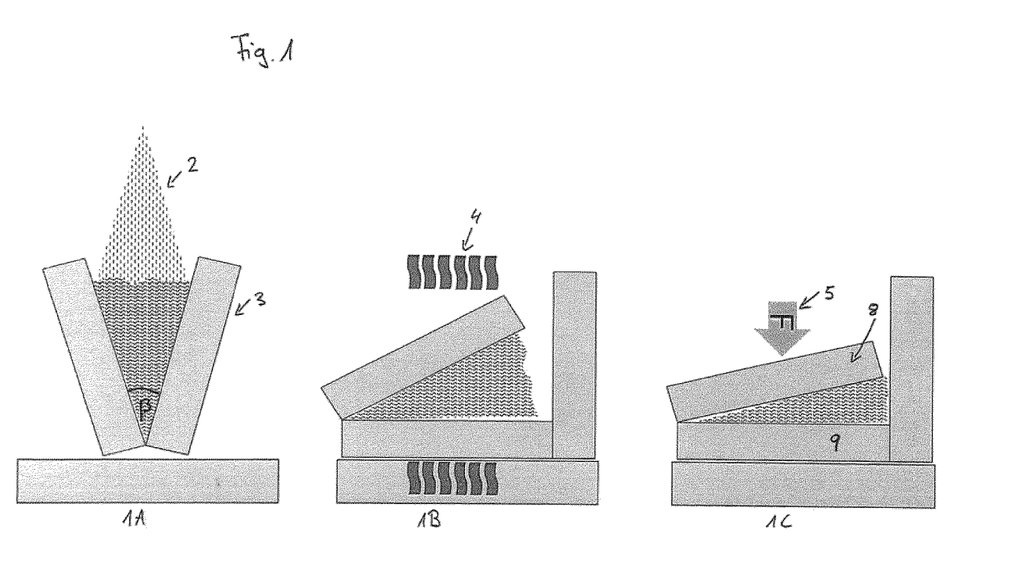
FIG. 1 shows schematically a method for producing a wedge filler preform.

In FIG. 1 a method for producing the wedge filler preform 1 (not shown) is schematically shown. In step A the reinforcing fiber bundles 2 are sprayed into a wedged formed mold 3. The fiber bundles 2 are distributed homogenously into the wedged formed mold 3. In this processing step nearly nil curved fiber bundles 2' (not shown) are presented within the wedged formed mold 3.

In a process step B the wedged formed mold 1 is closed and a thermal energy 4 is applied to the wedged formed mold 3 and thus to the distributed fiber bundles 2. Due to the thermal energy 4 the first resin composition of the fiber bundles 2 melts at least partially and gets a tacky character.

In a process step C a force 5 is applied to the wedged formed mold 3 and thus to the fiber bundles 2. The force 5 acts on a flank 8 of the wedged formed mold 3 and inside the wedged formed mold 3 the fiber bundles 2 are pressed in a curved form. Due to the at least partially melted first resin composition the curved form of the fiber bundles 2 are reversibly fixed within the wedged formed mold 3 (and thus within the wedge filler preform). Curved reinforcing fiber bundles are created. No further resin composition is used in this example for producing the wedge filler preform 1. The force 5 can also act on the fiber bundles 2 via both flanks 8 and 9 simultaneously.

Figure 2:
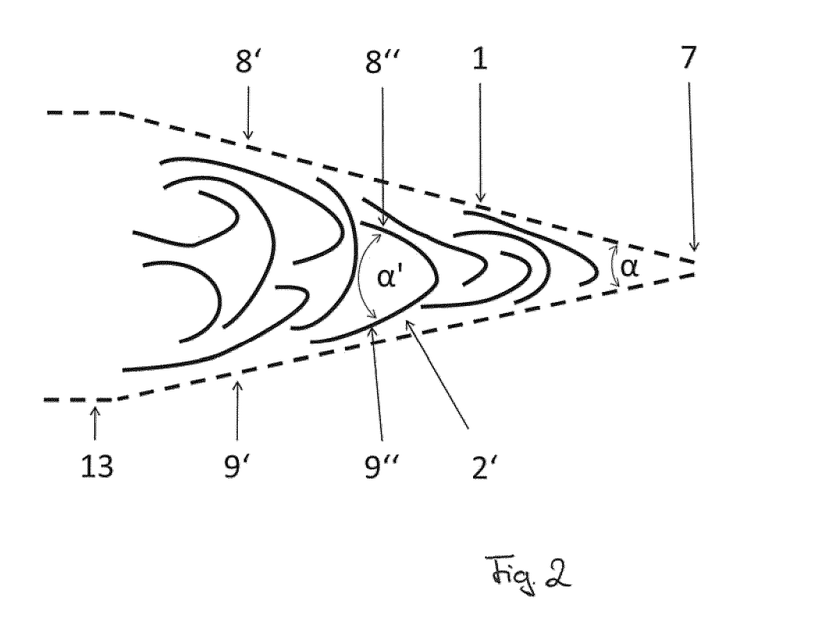

In FIG. 2 a wedge filler preform 1 in a side view is shown. In the side view it can be seen that the wedge filler preform 1 has a vertex 7, two flanks 8', 9' and an opening angle α. Within the wedge filler preform 1 the fiber bundles are arranged and reversibly fixed in a curved form (curved fiber bundles 2'). The curved fiber bundles 2' have a vertex, a first and second flank 8″, 9″ and an opening angle α'. The vertex of the curved fiber bundle 2' is parallel to the vertex 7 of the wedge filler preform 1. Also the opening angle α of the wedge filler preform 1 is open to the same direction as the opening angle α' of the curved fiber bundles 2'.

In the embodiment of FIG. 2 the wedge filler preform 1 has a textile layer, for example a fiber layer 13, as a sheath on the outer side of the wedge filler preform 1. Due to the fiber layer 13 the handling of the wedge filler preform 1 is easier.

Figure 3:
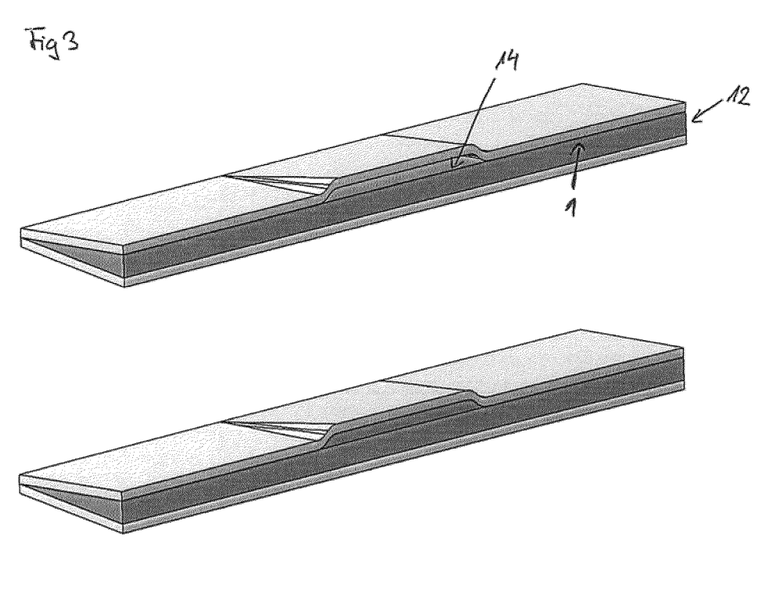
FIG. 3 shows schematically a form of a reinforcing composite.

In FIG. 3 an example for a form of a reinforcing fiber composite is shown. The form shows a cavity 12 with different thickness variations. A thickness variation is refillable with the wedge filler preform 1 without changing the mass per unit of the wedge filler preform 1. A cavity part 14 is empty afterwards the wedge filler preform 1 is filled within the cavity 12. After the composite is heated also cavity part 14 is filled with the wedge filler preform material.

Figure 4:
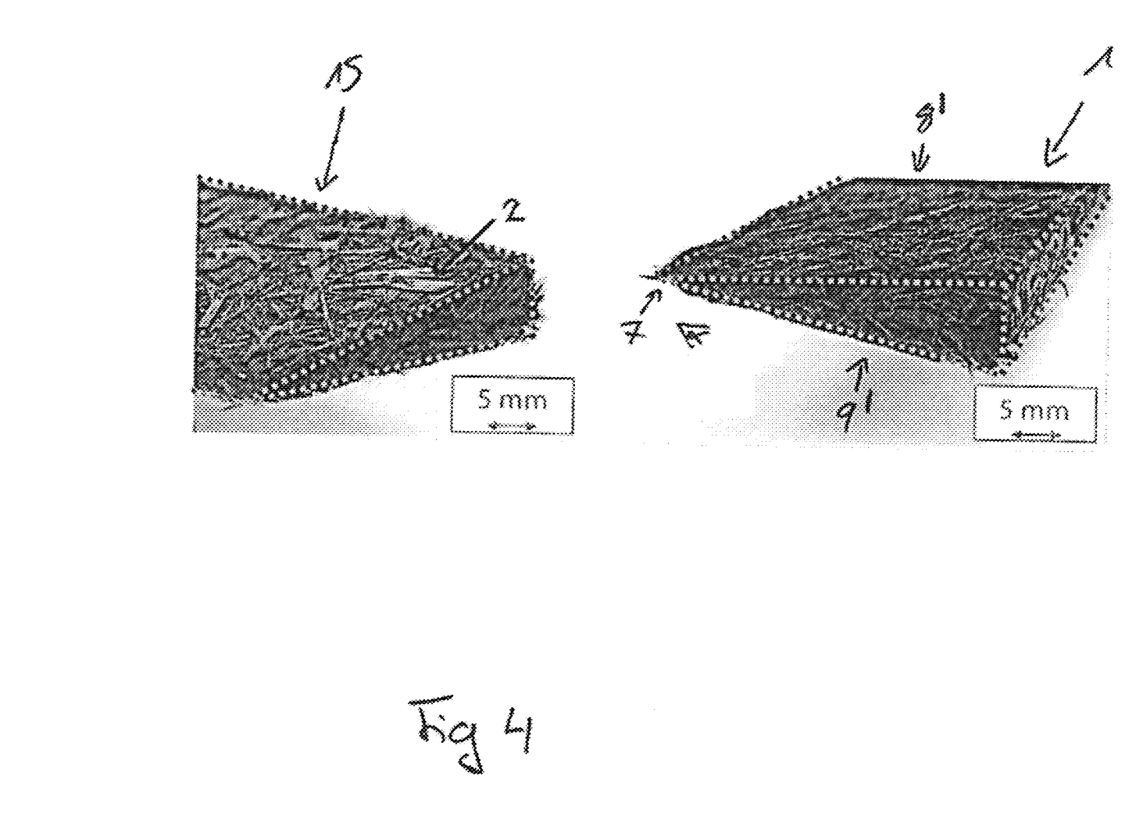
FIG. 4 shows a wedge filler preform.

In FIG. 4 a wedge filler preform 1 is shown. On the top side 15 of the wedge filler preform 1 the reinforcing fiber bundles 2 are oriented in a random (istropically) fashion, whereby the bundle form (filaments are parallel to each other within the bundle) is still existing in the wedge filler preform 1.

Figure 5:
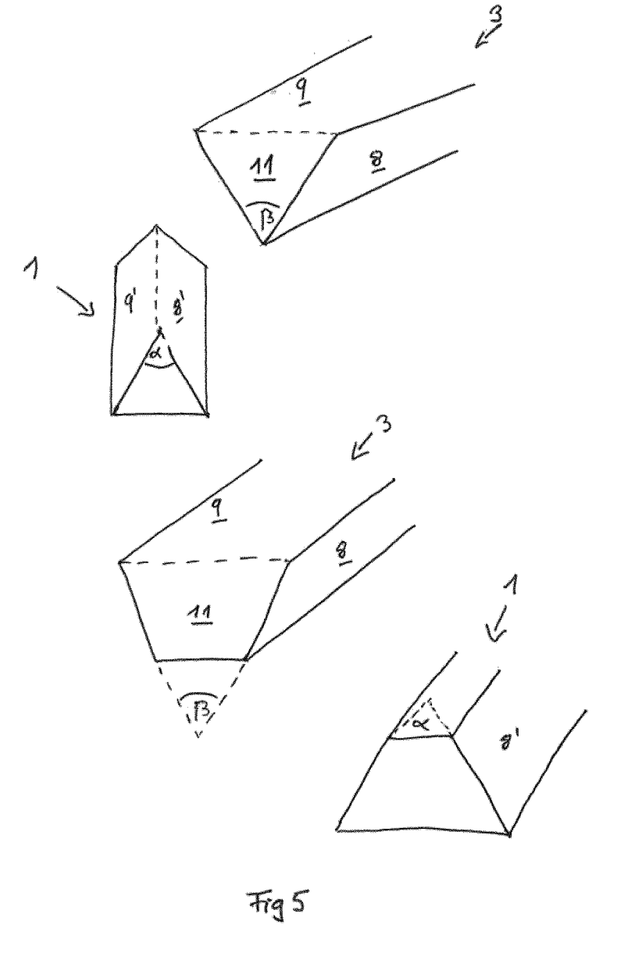
FIG. 5 shows schematically two embodiments for a wedge filer preform.

In FIG. 5 two embodiments for a wedged formed mold 3 and an obtained wedge filler preform 1 are shown. On top of the FIG. 5 a wedged formed mold 3 is shown with a triangular end face 11 and an opening angle β. The opening angle β corresponds to the opening angle α of the wedged filler preform 1. This means the value of the opening angle α is approximately equal to the value of the opening angle β. In addition, the direction of the opening angle α is approximately equal the opening direction of the opening angle β. On the bottom of FIG. 5 a wedged formed mold 3 with a trapeze end face 11 is shown. The opening angle β is created by an imaginary extension of the flanks 8 and 9 of the wedged formed mold 3. Also, the wedge filler preform 1 obtained by this wedged formed mold 3 comprises a triangular end face.

Figure 6:
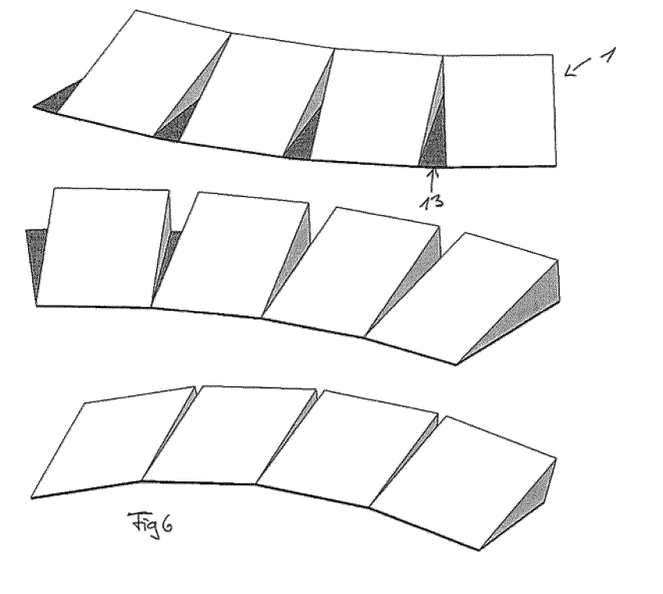
FIG. 6 shows schematically a wedge filler preform in a curved form.

In FIG. 6 a wedge filler preform 1—has an additional a flexible textile layer 13 (for example an non-crimp fabric)—on the backside of the wedge filler preform 1. The wedge filler preform 1 can be partially or completely separated into parts, whereby the flexible textile layer 13 holds the parts together (for example via gluing the parts on the flexible textile layer 13). Thus, the flexible textile layer 13 is not separated. Due to the separation the wedge filler preform 1 is adaptable on curved further preforms.

The invention claimed is:

1. A wedge filler preform comprising reinforcing fiber bundles consisting of reinforcing fiber filaments,
   wherein the filaments are directed parallel to each other within the reinforcing fiber bundle, wherein the reinforcing fiber bundle contains a first resin composition in a concentration in the range from 1 to 10 wt. % relative to the fiber weight,
   wherein the reinforcing fiber bundles have a length in the range from 2 to 20 mm and at least 60% of the reinforcing fiber bundles are reversibly fixed in a curved form within the wedge filler preform,
   wherein said fiber bundles further comprise curved flanks that create an opening angle of less than 120° and the opening angle of the curved reinforcing fiber bundles relates with an
   opening angle of the wedge filler preform,
   wherein the curved reinforcing fiber bundles are oriented isotropically in the direction parallel to the opening angle of the wedge filler preform, and
   wherein the fibers are oriented anisotropically within the individual reinforcing fiber bundles.

2. The wedge filler preform according to claim 1, wherein the reinforcing fibers of the reinforcing fiber bundles are carbon fibers.

3. The wedge filler preform according to claim 1, wherein each reinforcing fiber bundle has 500 to 24,000 reinforcing fiber filaments.

4. The wedge filler preform, according to claim 1 wherein the reinforcing fiber bundles are homogeneously distributed over the wedge filler preform.

5. The wedge filler preform according to claim 1, wherein the width of the reinforcing fiber bundles varies in the range of 0.5 to 10 mm.

6. The wedge filler preform according to claim 1, wherein the total amount of resin within the entire wedge filler preform is less than 10 wt. % relative to the total fiber weight of the wedge filler preform.

7. The wedge filler preform according to claim 1, wherein the wedge filler preform has on at least one surface side a textile layer or the wedge filler preform is covered by at least one textile layer.

8. The wedge filler preform according to claim 1, wherein the wedge filler preform is partially or completely separated in parts and arranged on a flexible textile layer.

9. The wedge filler preform according to claim 8, wherein the flexible textile layer is a woven, non-woven or unidirectional fiber layer.

10. The wedge filler preform according to claim 1, wherein the wedge filler preform has a constant mass per unit area.

11. A fiber composite comprising a wedge filler preform according to claim 1, whereby the wedge filler preform fits variable cavities of the composite.

12. A method for producing a wedge filler preform according to claim 1, wherein reinforcing fiber bundles comprising a first resin composition in a concentration in the range from 1 to 10 wt. % relative to the fiber weight, are filled into a wedge formed mold, whereby the wedge formed mold comprises two flanks and in between a mold opening angle and two end faces, whereby each surface area of the flanks is larger than each surface area of the end faces, whereby the fiber filaments of the reinforcing fiber bundles are directed parallel to each other within each reinforcing fiber bundle, wherein a force and a thermal energy is applied to the reinforcing fiber bundles in the wedge formed mold, whereby the force acts only on at least one of the flanks of the wedged formed mold and due to the force at least 60% of the reinforcing fiber bundles is curved and said fiber bundles further comprise curved flanks that create an opening angle of less than 120° and the opening angle of the reinforcing curved fiber bundles relates with a mold opening angle of the wedge formed mold, whereby the curved form of the reinforcing fiber bundles is reversibly fixed due to partial melting of the first resin composition by the thermal energy.

13. A method for producing a reinforced fiber composite, whereby a wedge filler preform manufactured according to claim 12 is used, whereby the wedge filler preform is arranged inside of a further fiber preform, whereby both preforms are located into a further mold and a second resin composition is applied into the further mold, whereby the opening angles of at least 20% of the curved reinforcing fiber bundles increase by at least 5° and fixed in this position after applying the second resin composition.

14. The method for producing a reinforcing fiber composite according to claim 13, whereby the wedge filler preform has a constant thickness gradient and the further fiber preform has cavities with thickness variations.

* * * * *